Patented Feb. 6, 1940

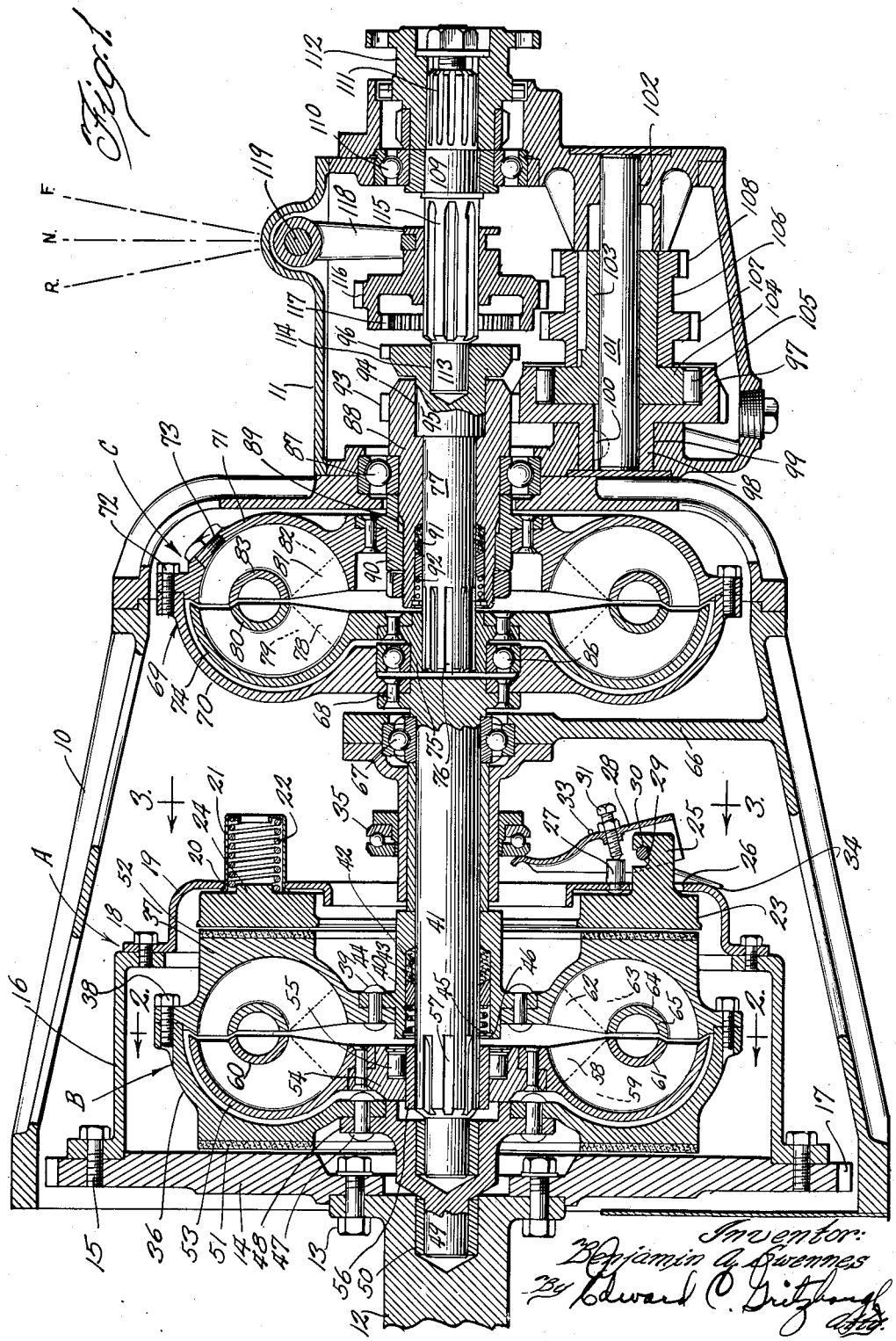

2,189,537

UNITED STATES PATENT OFFICE

2,189,537

MULTIPLE CLUTCH AUTOMATIC TRANSMISSION

Benjamin A. Swennes, Rockford, Ill., assignor to Borg-Warner Corporation, Chicago, Ill., a corporation of Illinois Application June 8, 1936, Serial No. 84,079

6 Claims. (Cl. 74—189.5)

This invention has to do with an automatic change speed transmission adapted for use upon motor propelled vehicles, and relates particularly to such a transmission having a plurality of power trains of graduated speed ratio, each having in series therewith an impositive clutch device increasing in driving efficiency upon an increase in speed, whereby the power trains are brought successively into driving relation between driving and driven transmission shafts.

The primary object of the present invention is the provision in a change speed transmission of an impositive clutch adapted to establish a substantially one-to-one ratio between driving and driven shafts, a lower ratio power train, and an additional impositive clutch for coupling said shafts through said lower ratio train. By the use of the additional impositive clutch mechanism it is possible to employ a low ratio train having a lower ratio providing for greater torque multiplication and increased acceleration of a vehicle to the running gear of which driving power is transmitted through the transmission device.

The invention as well as the above and other desirable objects will be fully understood upon reading the following description in conjunction with the accompanying four sheets of drawings hereby made a part of the specification, and wherein:

Fig. 1 is a vertical sectional view taken centrally through an automatic transmission mechanism constructed according to the present invention;

The same reference characters are used for designating like parts shown throughout the several figures of the drawings and referred to hereinafter in the description.

Figure 3:
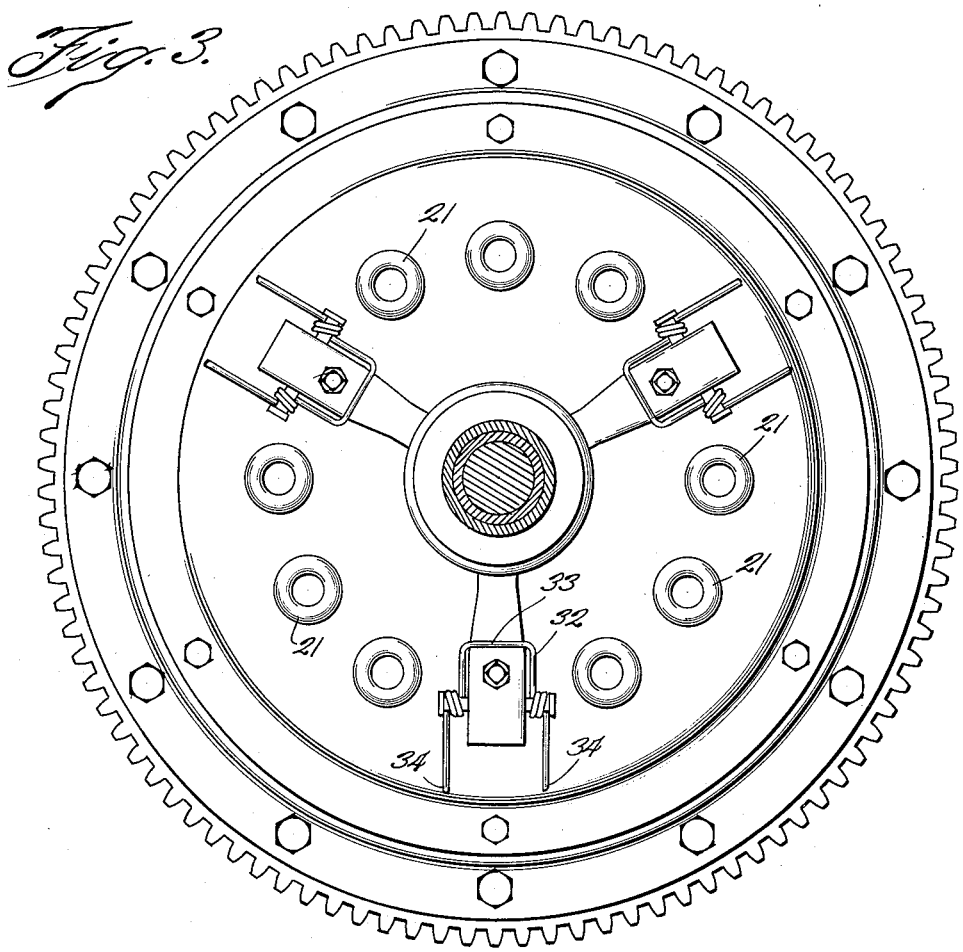
Fig. 3 is a view taken on the line 3—3 of Fig. 1 and illustrating manually operable control means for a friction clutch.
Figure 2:
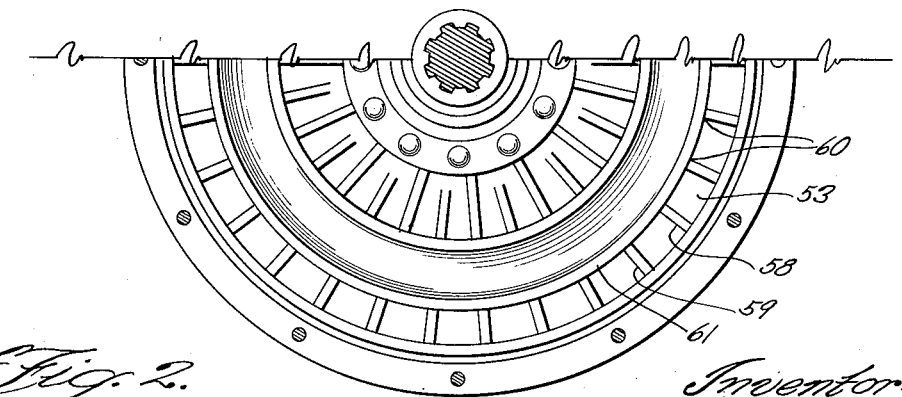
Fig. 2 is a fragmentary sectional view taken on the line 2—2 of Fig. 1.

That embodiment of the invention disclosed in Figs. 1, 2 and 3 is contained within a bell housing 10 and a gear box 11, which are suitably connected together. The front or left end of the bell housing 10 may be secured in any standard manner to the crank case of a vehicle engine, not shown. An engine crank shaft 12 has secured thereto by means of bolts 13 a fly-wheel 14, and the fly-wheel has secured thereto by bolts 15 a clutch casing 16. The fly-wheel 14 may have gear teeth 17 about its periphery for engagement by an engine starting gear, not shown.

Bolts 18 provide means for attaching a clutch cover plate 19 to the back of the clutch casing 16. Said cover plate has a plurality of apertures 20 for receiving spring cups 21, of which nine are illustrated in Fig. 3. Within each of the cups 21 is a compression spring 22 bearing between the caps of said cups and an annular pressure plate 23 comprising part of a friction clutch A. Bosses 24 upon the rear face of the pressure plate 23 extend into the forward ends of the springs 22 as a means for holding the springs in place against lateral movement. The pressure plate 23 has three equally spaced lugs 25 extending from its rear face, one of said lugs being plainly shown in Fig. 1. Said lugs extend through apertures 26 in registry therewith in the clutch cover plate 19 and adjacent to each aperture 26 there is anchored in the clutch cover plate 19 a fulcrum block 27. Three clutch throw-out fingers 28, which may be of pressed steel, each have a pin 29 engaged in a notch 30 formed in each of the lugs 25. An adjustable fulcrum member 31 in each of the clutch throw-out fingers 28 bears against a lug 27. The throw-out fingers 28 are held in place by means of springs indicated generally by the reference character 32, said springs being wrapped about opposite ends of the pins 29 and tending to rotate the throw-out fingers 28 counter-clockwise, Fig. 1, by spring saddle sections 33 bearing against the throw-out fingers and end sections 34 bearing reactively against the clutch cover plate 19. When the radially inward ends of the clutch throw-out fingers are moved forwardly by manual manipulation of a clutch throw-out bearing 35, which is movable axially of the transmission mechanism, said fingers will be rotated counter-clockwise, Fig. 1, about an axis coinciding with the point of contact between the members 31 and 27, and whereby the pressure plate 23 is retracted rearwardly of the transmission mechanism against the urge of springs 22.

Contained within the clutch casing 16 is a fluid clutch B. Said clutch consists of a clutch impeller member having two parts 36 and 37 secured together about their circular peripheries by a series of bolts 38. The impeller part 37 is secured by rivets 39 to a sleeve 40 which is rotatively disposed upon a shaft section 41. Leakage of fluid from the clutch impeller member along the shaft 41 is prevented by means of a ring of packing material 42 stuffed within a recess 43 of the sleeve 40 where such packing is held compressed by a spring 44 backed by a ring 45 snapped into position within a groove 46 circumscribing the interior of the recess 43.

The forward part 36 of the clutch impeller is attached by means of rivets 47 to a flange 48 upon a stub shaft 49 piloted within a recess 50 formed in the crank shaft 12. Annular clutch facings 51 and 52 are fastened respectively upon the front and rear faces of the clutch impeller.

Within the clutch impeller of clutch B is a clutch driven member or runner 53, the hub 54 of which is connected by means of overrunning clutch rollers 55 to a sleeve 56 which is splined at 57 to the shaft 41. In Fig. 2, the clutch driven member 53 will be seen to have upon the back dished face thereof a series of radially extending vanes 58 disposed in alternate relation with slightly shorter vanes 59. Each of the vanes 58 and 59 has a notch 60 which adapt the vanes to receive an annular fluid guide ring 61. The rear part 37 of the fluid clutch impeller has vanes 62 and 63 corresponding to vanes 58 and 59 of the clutch driven member 53, said vanes 62 and 63 being notched at 64 so that they may receive in opposed relation to the guide member 61 a similar and complemental guide member 65. When the impeller of clutch B is rotated with respect to the runner 53, fluid within the device is circulated by the vanes 58, 59, 62 and 63, and by the fluid guide rings 61 and 65 in such a manner as to cause the runner 53 to tend to follow the movement of the impeller. This tendency of the runner 53 to follow in rotation with the impeller increases with the speed of the impeller, or, stated differently, the power transmitting efficiency of the impositive clutch device increases as a function of clutch speed.

A bracket 66 secured to the bell housing 10 supports a bearing 67 for rotatively supporting the shaft 41. The back end of the shaft 41 is connected by pins 68 to the impeller 69 of a fluid clutch C having a structure very similar to clutch B. Parts 70 and 71 are bolted together at 72 about their engaged circular peripheries. The clutch member 71 contains a plugged opening 73 through which oil or other flowable substance driving medium may be introduced into the clutch. A similar opening, not shown, is provided in the impeller of clutch B. Within the clutch impeller 69 is a runner 74 having thereon a sleeve hub 75 splined at 76 to a shaft section 77. The runner 74 has vanes 78 and 79 which correspond to the vanes 58 and 59 of the runner 53, and carries a fluid guide ring 80 corresponding to the ring 61 of the runner 53. In opposed relation to the vanes 78 and 79 and the guide ring 80 are corresponding vanes 81 and 82 and a guide ring 83. A ball bearing 86 is disposed between the sleeve hub member 75 and the impeller member 70.

Aligned apertures in the adjacent walls of the bell housing 10 and the gear box 11 support a ball bearing 87 through which extend the shaft 77 and a hollow shaft 88. The hollow shaft 88 is splined at 89 for connection with a hub 90 to which the part 71 of the impeller 69 is attached. Leakage of fluid from the clutch C along the shaft 77 is prevented by packing 91 held in place by a spring 92 similarly to the packing 42 previously described. The rear end of hollow shaft 88 has thereon gear teeth 93 and contains an enlarged bearing 94. Journalled within the bearing 94 is an enlarged section 95 of the shaft 77, said enlarged shaft section having thereon a jaw clutch 96.

In constant mesh with the gear 93 is a gear 97 having a hub 98 journalled in a bearing 99 within the forward end wall of the gear case 11. Said hub 98 is keyed at 100 to a jack shaft 101 having its back end journalled in a gear case bearing 102. Rotatively disposed upon the jack shaft 101 is a sleeve 103 having an enlarged forward end section 104 with cam surfaces, not shown, for coacting with overrunning clutch rollers 105 in the conventional manner. A gear cluster 106 is secured non-rotatively to the sleeve 103 and embodies gears 107 and 108.

Within the rear end wall of the gear box 11 is a driven shaft 109 journalled in a ball bearing 110. Said driven shaft 109 has splined thereto at 111 a coupling member 112 for attachment to the vehicle torque tube, not shown. The forward end of the driven shaft 109 has a section 113 of reduced diameter piloted within a bearing 114 of shaft 77. Splines 115 upon the driven shaft 109 provide means for a non-rotative connection of the gear 116 thereto. Integral with the gear 116 is an internal jaw clutch 117, which may be engaged with the jaw clutch 96 when the gear 116 and clutch 117 are shifted forwardly by movement of a manually controlled shifter fork 118. The gear 116 is adapted to be meshed with the gear 107 and the clutch 117 with the clutch 96 when the shifter fork 108 is pivoted about the axis of its shaft 119 to position F. Upon movement of the shifter fork 118 to position R, the gear 116 will be shifted axially of the shaft 109 to a position in alignment with the gear 108 where said gear 116 will be enmeshed with an idler gear, not shown, driven by the gear 108, whereby a reverse rotative movement of the driven shaft 109 is obtained. In Fig. 1, the manually controlled shifter fork 118 is shown in the neutral position N, thereby positioning the gear 116 in its neutral position between gears 107 and said idler gear, not shown.

The operation of that form of the invention illustrated in Figs. 1, 2 and 3 will now be described.

When the manually controlled thrust bearing 35 is released, said bearing will permit the springs 22 to force the pressure ring 23 forwardly, whereby the clutch facings 51 and 52 upon opposite sides of the clutch impeller of clutch B are gripped between the front face of the pressure ring 23 and the rear face of the fly-wheel 14. With the impeller member of clutch B thus connected with the vehicle engine, said engine may be rotated at idling speed without imparting to the clutch driven element 53 enough torque to cause movement of the vehicle. Incident, however, to an increase in speed of the vehicle engine more and more torque will be imparted to the driven element 53, and torque will then be transmitted through the overrunning clutch rollers 55 and splined sleeve 56 to the shaft 41, and thence to the impeller 69 of clutch C, then to hollow shaft 88, gear 93, gear 97, overrunning clutch rollers 105, sleeve 103, and gears 107 and 116 (when the shifter fork 118 is in position F) to the driven shaft 109. A reduced speed of the driven shaft 109 is obtained both through the slippage between the driving and driven parts of clutch A and through the reduction gearing in the gear box 11, such gearing providing a mechanical advantage or multiplication of engine driving torque. As the vehicle proceeds in the forward direction and the speed of clutch B increases, the driving efficiency of said clutch likewise increases, so that the speed of the driven element 53 more nearly approaches the speed of the impeller. Likewise, the speed of the impeller 69 of clutch C increases and the torque imparted to the runner 74 increases. After a predetermined speed of the clutch impeller 69 has been reached, providing a normal load remains on the driven shaft 109, the torque delivered through the fluid medium in clutch C to the runner 74 will be adequate to carry the vehicle load. When this condition of torque delivery prevails, power will be transmitted directly from the engine through clutches A and B, shaft 41, clutch impeller 69, clutch runner 74, shaft 77, jaw clutch elements 96 and 117 to the driven shaft 109. At this time, the slip between the impositive clutch impellers and their respective runners 53 and 74 will be very slight, so that the driven shaft 109 will be caused to rotate at substantially the same speed as the crank shaft 12. Meanwhile, the gear 116 which remains in mesh with the gear 107 will cause the sleeve head 104 to rotate faster than the gear 97 as is permitted by the clutch rollers 105.

Were the crank shaft 12 connected directly to the impeller 69 instead of being connected thereto through the impositive clutch B, the impeller 69 would, at a lower engine speed, be caused to rotate at a speed adequate to give to the clutch C a driving efficiency capable of establishing the substantial one-to-one driving ratio between the crank shaft 12 and the driven shaft 109. It will be conceived that if the substantially one-to-one driving ratio power train is established between shafts 12 and 109 while the vehicle engine is rotating at a speed below that at which it operates to develop its maximum torque, the rate of acceleration of the vehicle will not be the maximum obtainable. This unhappy condition may be overcome by increasing the speed ratio of the gears which are interposed in the low speed power train, but only by creating another disadvantage, namely, that of giving to the transmission mechanism a starting power train of too high a ratio for rapid acceleration upon the car being started from rest. With the present device a very low ratio gear train may be used, but the transfer of torque from the driving member to the higher ratio train is delayed until the engine has attained sufficient speed to develop the torque required to accelerate and carry the load through the higher ratio train.

It will be noted that when the shifter fork 118 is in the position N, the jaw clutch element 117 is out of mesh with the clutch element 96 as well as the gear 116 being disconnected from a source of driving power. It is, therefore, impossible for the driven shaft 109 to receive driving force from either the direct drive power train including the shaft 77 or through the low speed ratio power train including the gear 107.

When the yoke 118 occupies the position R, the driven shaft 109 can be driven only through the speed reduction gearing inasmuch as the connection between clutch elements 96 and 117 remains broken.

Figure 4:
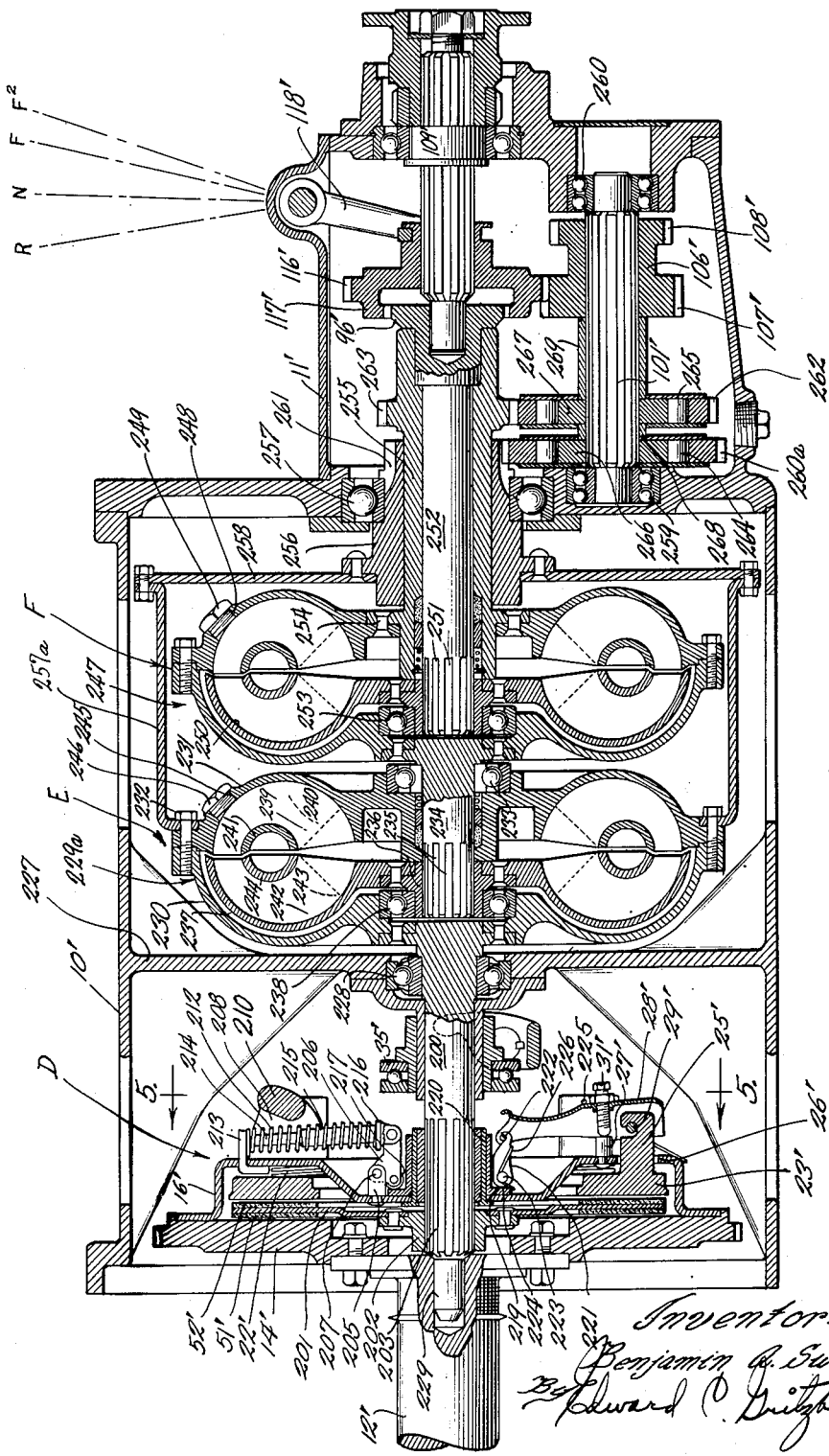
Fig. 4 is a view similar to Fig. 1, but of a modified form of transmission mechanism.
Figure 5:
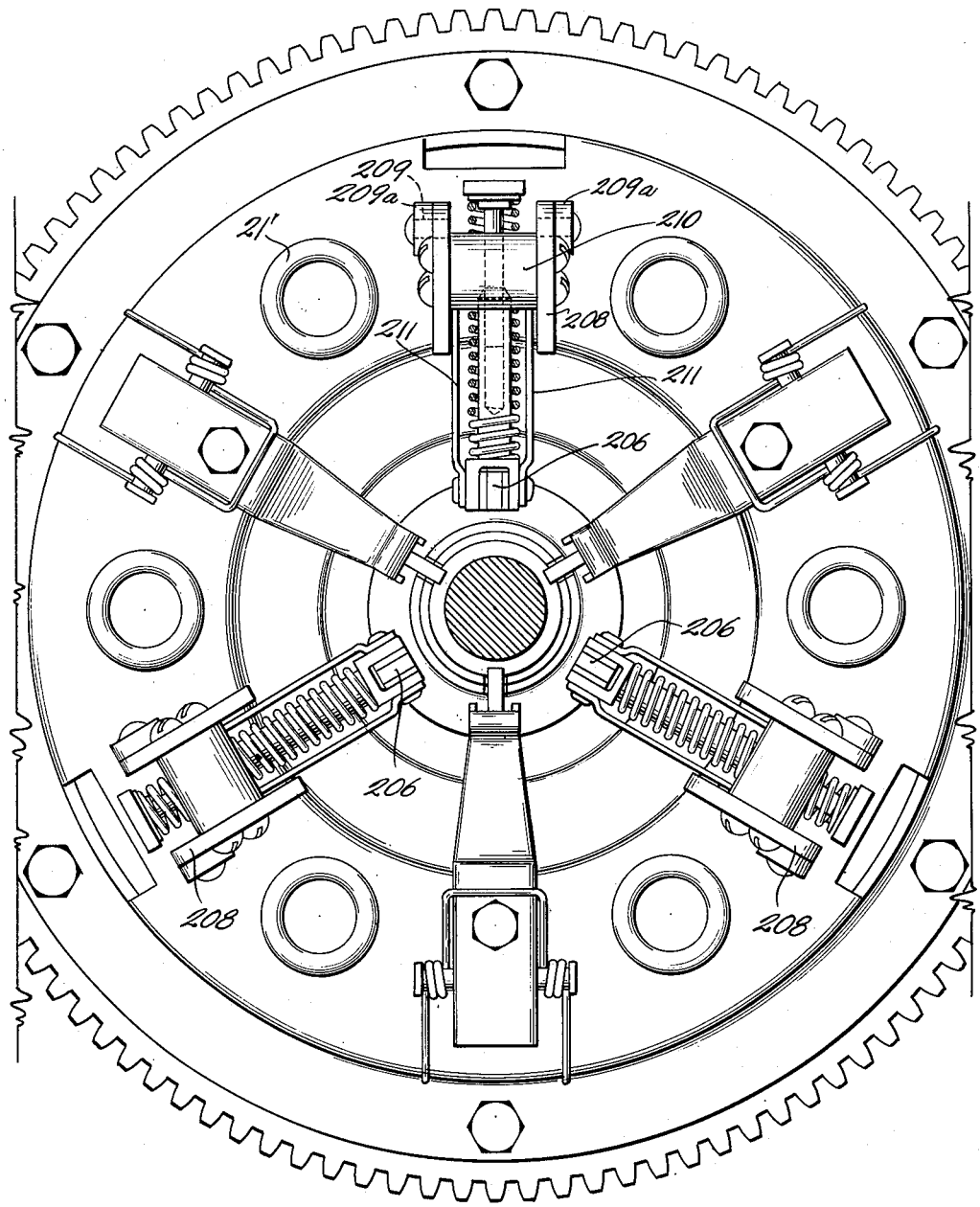
Fig. 5 is a transverse sectional view taken on the line 5—5 of Fig. 4.

In the following description of that form of the invention shown in Figs. 4 and 5, parts corresponding to those shown in Figs. 1, 2 and 3 will be indicated by the same reference character, but with the addition of a prime. Referring first to Fig. 4, the transmission will be seen as driven from a crank shaft 12' having attached thereto a fly-wheel 14' disposed in the forward end of a bell housing 10'. The fly-wheel 14' has attached to its rear face a clutch casing 16'.

An automatic friction clutch D is employed for connecting the crank shaft 12 to a transmission shaft 200. The clutch D includes a pressure ring 23' which is adapted to compress therebetween and the back of the fly-wheel 14' clutch facings 51' and 52' which are secured upon opposite sides of a driven clutch disk 201. The friction clutch disk 201 has a hub 202 splined at 203 to the shaft 200. Disposed equi-angularly about the back side of the clutch cover 16' are three U-shaped brackets 205 between the legs of which are secured levers 206 by means of pivot pins 207; see Figs. 4 and 5. Centrifugal weights 208 are pivoted at 209 to lugs 209ª upon the clutch cover plate 16'. The weights upon each pair of lugs 209ª have disposed therebetween cross pieces 210 which add to the centrifugal mass of the weights 208 and to the rigidity of their interfabrication. Paired links 211 form a connection between an end of each lever 206 and the weights 208 in radial alignment therewith. The links 211 are pivotally connected with the levers 206 and with their respective weights, the connection with the weights being at a point selectively spaced from their point of pivotal anchorage. A compression spring 212 is placed between each lug 213, secured to the clutch cover plate 16' adjacent each pair of lugs 209ª, and the end of the lever 206 opposed thereto. Telescopically connected guide pins 214 and 215 connected respectively to the lugs 213 and to coupling members 216, which are disposed between the levers 206 and the links 211, serve as retaining means for the springs 212.

Upon the ends of the levers 206 opposite to that to which the links 211 are coupled are journalled rollers 217. The rollers 217 are arranged for exerting pressure against a flange 219 turned radially outwardly from a sleeve 220 which is slidable axially of the transmission device. At this time, it should be noted that the levers 206 are designed to multiply the force of the springs 212 as applied to the sleeve flange 219.

Arranged alternately with the centrifugal mechanisms just described on the back of the clutch casing 16' are three openings 26'. Three bosses 25' extending rearwardly from the pressure plate 23' project through the openings 26'. Pivotally connected with each of the bosses 25' by means of pins 29' are clutch throw-out fingers 28'. Adjustable fulcrum members 31' abut against the fulcrum blocks 27', and the inner ends of the fingers 28' are connected to the slidable sleeve 220 by means of links 221. The links 221 are secured to their respective levers 28' by means of pins 222 and to the sleeve 220 by means of pins 223 anchored in ears 224 projecting radially from the sleeve 220. Spring devices 225 and 226 mounted respectively upon pins 29' and 223 bear against levers 28' and links 221 to prevent rattling of such levers and links during operation of the transmission.

Six spring cups or seats 21' are arranged about the back side of the clutch casing 16' in alternate relation with the centrifugal devices and the levers 28'. Strong compression springs 22', Fig. 4, have an end confined within the cups 21' and an opposite end bearing against the back of the pressure plate 23'. Thus, it will be seen that the spring 22' at all times urge the pressure ring 23' forwardly into a position in engagement with the friction element 52'. The springs 212 are appreciably lighter and possessive of less force than the springs 22', but are effective to overcome the force of the springs 22', because of the mechanical advantage gained through the levers 206 and 28'. When, however, the fly-wheel 14' is rotated at a speed greater than idling speed of the vehicle motor, the weights 208 are thrown outwardly whereby to move the links 211 radially outwardly to compress the springs 212, which normally oppose and overbalance the force of the springs 22'. Outward movement of the links 211 concurrently with the compression of the springs 212 and counter-clockwise pivotal movement of the levers 206, Fig. 4, permits the springs 22' to force the pressure plate 23' forwardly, meanwhile pivoting the levers 28' in a clockwise direction, and shifting the sleeve 220 rearwardly. The force exerted by the pressure plate 23' against the friction element 52' moves the clutch driven element 210 slightly forwardly to concurrently effect an engagement between the friction element 51' and the fly-wheel 14'. Thus, by increasing the speed of the vehicle engine above idling speed, the shaft 200 may be connected directly to the crank shaft 12'.

A dividing wall 227 in the housing 10' is suitably apertured for containing a ball bearing 228 which rotatively supports the back end of the shaft 200. The forward end of the shaft 200 is reduced in diameter at 229 and journalled in the back end of the crank shaft 12'. An impositive fluid clutch E comprises an impeller 229ª having parts 230 and 231 secured together by a plurality of bolts 232. The part 230 is secured in any suitable manner to the back end of the shaft 200, whereas the part 231 is journalled by means of a ball bearing 233 upon a shaft 234. Splined at 235 to the shaft 234 is the hub 236 of a clutch runner 237. A ball bearing 238 permits of relative rotation between the impeller part 230 and the hub 236. Upon the interior of the impeller part 231 are fluid impelling vanes 239 and 240 which carry a fluid guide ring 241. The runner 237 has fluid impelled vanes 242 and 243 which carry a fluid guide ring 244. Clutch E and the vanes and fluid guide rings therein are of similar structure as those previously described in connection with clutches B and C. Fluid may be introduced into the clutch E by means of an opening 245 which is normally closed by a screw cap 246.

Secured to the back end of the shaft 234 is an impeller 247 of an impositive clutch F. Said impeller 247 has an opening 248 and a cap therefor 249 similar to the opening 245 and cap 246. The runner 250 of the clutch F is splined at 251 to a shaft 252 and a ball bearing 253 is disposed between the forward part of the impeller 247 and the hub of the runner 250. It will be noted from the drawing that the impeller 247 and the clutch driven element 250 each contain fluid impelling and impelled vanes and fluid directing rings corresponding to those shown in clutches B, C and E. The rear section of the impeller 247 is connected by pins 254 to a hollow shaft 255. Such shaft 255 encloses the shaft 252 and is itself enclosed within a hollow shaft 256, which is journalled within a ball bearing 257 disposed within the rear end wall of the housing 10'. The back ends of shafts 252, 255 and 256 all project into the gear box 11'.

Connection is had between the shaft 256 and the impeller 229ª of the clutch E by means of a cylindrical member 257ª of a large diameter adapting it to contain the clutch F, said cylindrical member 257ª being secured to the impeller 229ª by the bolts 232. The back end of cylindrical member 257ª is connected to the shaft 256 by a disk 258.

Disposed rotatively within the gear box 11' is a counter-shaft 101', said shaft being journalled at 259 and 260 in the two ends of the gear box 11'. A gear 260ª co-axial with the counter-shaft 101' is in constant mesh with gear teeth 261 cut within the rear end of the shaft 256. A gear 262 of less diameter than the gear 260ª meshes with gear teeth 263 upon the hollow shaft 255. Gears 260ª and 262 are connected, respectively, by overrunning clutch rollers 264 and 265. Cam rings 266 and 267 provide a connection between the clutch rollers 264 and 265 and the splined shaft 101'. A collar 268 maintains a selected spacing between cam rings 266 and 267, whereas the spacing between the cam ring member 267 and a gear cluster 106' is maintained by a collar 269. Gears 107' and 108' are formed upon the cluster gear element.

The gear 116' splined upon the driven shaft 109' is shiftable into any one of four positions corresponding to positions R, N, F and F² of the manually actuable shifter fork 118'. Shifter fork 118' is illustrated in position F, whereby the transmission mechanism is arranged for driving the vehicle in the forward direction. In this position of the fork 118' the gear 116' is meshed with gear 107' and jaw clutch 117' is interlocked with jaw clutch element 96'.

Operation of that form of the invention shown in Figs. 4 and 5 will now be described.

The device is capable of providing power trains of three different speed ratios between the propeller shaft 12' and the driven shaft 109'. While the engine is standing idle or is rotating at a speed not in excess of engine idling speed, the centrifugal weights 208 of clutch D will be in the position shown in Fig. 4. Springs 212, therefore, will be permitted to predominate over springs 22' and clutch D will remain unengaged. Upon increasing the speed of the engine above idling speed, the weights 208 will be thrown centrifugally outwardly, whereby the springs 22' become effective for closing clutch D in the manner hereinabove described, and whereupon the crank shaft 12' becomes connected to the shaft 200. This connection having been made between shafts 12' and 200, a power train of low speed ratio will have been established between the shaft 12' and the driven shaft 109', said power train including in addition to the clutch D and the shaft 200, the impeller 229ª of clutch E, cylinder 257ª, disk 258, hollow shaft 256, gear 261, gear 260ª, clutch rollers 264, jack shaft 101', gear 107' and the gear 116'. A speed reduction and torque multiplication is obtained through the gears 261, 260ª, 107' and 116'. While the vehicle is being propelled forwardly by means of the power train just described, the clutch impeller 229ª of clutch E will be rotating at a speed in excess of that of the runner 237. However, upon sufficient increase in speed of the impeller 229ª, more and more torque will be transmitted to the impeller 237 until finally such torque is sufficient to drive the driven shaft 109' through a power train of higher or intermediate speed ratio. The intermediate speed ratio train includes the clutch D, shaft 200, impeller 229ª, clutch runner 237, shaft 234, clutch impeller 247, hollow shaft 255, gear 263, gear 262, clutch rollers 265, cam ring member 267, jack shaft 101' and gears 107' and 116'. While the shaft 109' is being driven at the higher speed through the intermediate ratio train, the cam ring member 266 will be rotated at a speed in excess and in the same direction as the gear 260ª, but the clutch rollers 264 permit the cam ring 266 to thus overrun the gear 260ª.

Direct drive is established between the shafts 12' and 109' after the vehicle has attained a speed at which the clutch impeller 247 is rotating at a speed sufficient to transmit a driving torque to the runner 250 adequate to carry the vehicle load. The third speed or direct driving power train includes in serial relation the clutch D, shaft 200, impeller 229ª, runner 237, shaft 234, impeller 247, runner 250, shaft 252, jaw clutches 96' and 117' and the body of the gear 116' which is splined to the shaft 109'. During direct drive of the shaft 109', the jack shaft 101' will be driven at a speed in excess of both gears 260ª and 262 as permitted by clutch rollers 264 and 265.

The double impositive clutch arrangement shown in Fig. 4 accomplishes the same objective as the double clutch arrangement shown and described in connection with that form of the device shown in Figs. 1, 2 and 3; that is, the impositive clutch E permits of the use of a power train of a selected speed reduction ratio to be interposed between the impeller thereof and the driven shaft 109', while adapting the vehicle engine to rotate at a sufficiently high speed before driving torque is diverted in a substantial amount through the so-called direct drive power train.

When it is desired that the vehicle shall be driven in the lower speed ratio power trains without automatically changing into the high speed power train, the shifter fork 118' will be moved into position F², so that the jaw clutch element 117' will be shifted forwardly of and out of mesh with the jaw clutch element 96', the gear 116' remaining in mesh with the gear 107'. The direct power train being thus demobilized, power may be transmitted to the driven shaft 109' only through the low speed power train or the intermediate speed power train. Such a driving condition is frequently desirable when the vehicle is proceeding over rough roads while making detours or the like.

Arrangement of the transmission mechanism in the neutral position is accomplished by shifting the fork 118 into position N so that the jaw clutches 96' and 117' are disconnected as well as the gears 116' and 107'. The gear 116' will then be disposed in the space between the gears 107' and 108'.

Reverse drive of the shaft 109' may be had by shifting the fork 118' into position R and thus sliding the gear 116' rearwardly into alignment with the gear 108' into mesh with an idler gear, not shown, driven from the gear 108'. It will be noted that the shaft 109 may be reversely driven either through the low or intermediate speed power trains, but not through the direct drive train.

I claim:

1. A change-speed transmission comprising a driving and driven members, and a speed-responsive mechanical clutch, driven from the driving member, a plurality of fluid clutches and a plurality of gear trains of different speed ratios adapted to be connected between the mechanical clutch and driven member, said fluid clutches comprising an impeller driven directly from the mechanical clutch, a runner adapted to be driven from the impeller, a second impeller secured to the runner for rotation therewith, and a second runner cooperating with said second impeller, means for connecting the first impeller to a gear train, means for connecting the second impeller to another gear train, means for connecting the second runner to the driven member, and overrunning clutches in each of the gear trains, whereby said driven member can be made to increase in speed automatically from a condition of rest to a condition of synchronism with the driving member while said driving member is rotating within a small range of speeds.

2. An automatic change-speed transmission comprising driving and driven members, a speed-responsive friction clutch driven from said driving member and becoming effective to transmit torque therefrom upon the driving member attaining a predetermined speed, and means for bringing the driven member up to the speed of the driving member from a condition of rest, said means comprising slippable fluid clutches in series with one another, and gear trains of different speed ratios, the impeller of one of said fluid clutches being driven directly from the friction clutch and in series with the lowest speed ratio train, a runner cooperating with said impeller, a second impeller secured to said runner for rotation therewith, said second impeller being in series with the next lowest speed ratio train, a runner cooperating with the second impeller, overrunning clutches in series with said trains, and a direct connection between the second runner and the driven member, whereby said driven member, upon a sufficient increase in speed of the driving member to operate the friction clutch, is first driven through the first impeller and lowest ratio gear train, then through the first runner and associated second impeller and second lowest ratio gear train while overrunning the clutch in the first gear train, and finally through the second runner and direct connection while overrunning both clutches.

3. An automatic change-speed transmission comprising driving and driven members, a friction clutch in series with the driving member and adapted to be operative only upon the driving member attaining a predetermined speed, and means intermediate the clutch and driven member for bringing said driven members up to the speed of said driving member, said means comprising an impeller, a low ratio gear train and an overrunning clutch, all in series with the driven member, a runner cooperatively related to the impeller, a second impeller, a gear train of higher speed ratio and an overrunning clutch, said runner, second impeller and higher ratio train also being in series with the driven member, and a runner cooperatively related to the second impeller and directly connected to the driven member, whereby said driven member upon an operation of the first mentioned clutch, is driven from the first impeller and lowest speed ratio train, then from the first runner and gear train of higher speed ratio while overrunning the first-mentioned overrunning clutch and then from the second runner at substantially the speed of the driving member, while overrunning both of said overrunning clutches.

4. An automatic change-speed transmission comprising driving and driven members, a friction clutch in series with the driving and driven members and adapted to be operative only upon the driving member attaining a predetermined speed, and means for bringing said driven member up to the speed of the driving member, said means comprising an impeller driven from said clutch, a runner cooperatively related to said impeller and adapted to transmit torque therefrom upon an increase in speed of said impeller, a second impeller drivingly connected to said runner, a gear train of low speed ratio and an overrunning clutch in series with said impeller and said driving member, and a runner cooperatively related to said second impeller and adapted to be drivingly connected to the driven member, whereby no torque is transmitted to the driven member while the driving member is rotated below a predetermined speed, but upon an increase in speed, said first mentioned clutch is first operated, then the first mentioned runner and second impeller are rotated, thereby driving the driven member and increasing its speed until the speed of the driving member is attained, whereupon said second runner drives the driven member while overrunning said overrunning clutch.

5. An automatic change speed transmission comprising driving and driven members, a speed responsive friction clutch for transmitting torque from the driving member to the driven member, a plurality of power trains of different speed ratios adapted to be connected between the friction clutch and driven member, and a plurality of fluid clutches in series with one another and with the highest speed ratio train, one of said clutches being in parallel with another power train, said fluid clutches being successively operable and thereby serving to delay the transmission of torque from the driving member to the driven member through the highest speed ratio train until the driven member is rotating at a speed within the range of speed at which the driving member is designed to be most efficient.

6. A change speed transmission comprising driving and driven members, a plurality of power trains of graduated mechanical advantage establishable in driving relation between said members, one way drive means in series with each of said power trains excepting the one of least mechanical advantage, and means for establishing said trains in such driving relation comprising clutch means effective to establish the driving relation of the train of greatest mechanical advantage incident to an increase in speed of the driving member, and a plurality of clutch devices including driving and driven elements adapted to increase in driving efficiency upon an increase in rotative speed of their respective driving elements, there being one of said devices in each power train except the train of greatest mechanical advantage, and the driving element of said devices being driven by the train of next greater mechanical advantage, each of said one way drive means operating to prevent the transmission of torque from the driven member of the clutch of its power train to the driving member of said clutch when the train of next lower mechanical advantage is made effective.

BENJAMIN A. SWENNES.